United States Patent
Cerri, III (10) Patent No.: US 10,508,701 B2
(45) Date of Patent: Dec. 17, 2019

(54) VEHICLE SUSPENSION BUSHING ASSEMBLY AND METHOD OF ASSEMBLING THE SAME

(71) Applicant: The Pullman Company, Milan, OH (US)

(72) Inventor: Joseph F. Cerri, III, Norwalk, OH (US)

(73) Assignee: The Pullman Company, Milan, OH (US)

(*) Notice: Subject to any disclaimer, the term of this patent is extended or adjusted under 35 U.S.C. 154(b) by 226 days.

(21) Appl. No.: 15/480,873

(22) Filed: Apr. 6, 2017

(65) Prior Publication Data

US 2018/0291975 A1 Oct. 11, 2018

(51) Int. Cl.
*F16F 1/38* (2006.01)
*B60G 7/00* (2006.01)

(52) U.S. Cl.
CPC .............. *F16F 1/38* (2013.01); *B60G 7/001* (2013.01); *B60G 7/008* (2013.01); *F16F 1/3842* (2013.01); *B60G 2204/41* (2013.01); *B60G 2206/40* (2013.01); *B60G 2206/8207* (2013.01); *B60G 2206/82092* (2013.01); *F16F 1/3814* (2013.01); *F16F 2228/08* (2013.01)

(58) Field of Classification Search
CPC .... B60G 7/001; B60G 7/008; B60G 2204/41; B60G 2206/40; B60G 2206/8207; B60G 2206/82092; F16F 1/3842; F16F 1/3814; F16F 1/38; F16F 1/3807
See application file for complete search history.

(56) References Cited

U.S. PATENT DOCUMENTS

| 4,139,246 A | | 2/1979 | Mikoshiba et al. |
| 4,428,629 A | * | 1/1984 | Colanzi ............... F16C 33/7846 384/144 |
| 4,767,108 A | * | 8/1988 | Tanaka .................... B60G 7/00 267/140.12 |
| 4,809,960 A | * | 3/1989 | Kakimoto ................ B60G 7/00 248/634 |

(Continued)

FOREIGN PATENT DOCUMENTS

| EP | 0493731 A1 | 7/1992 |
| JP | H03272315 A | 12/1991 |

*Primary Examiner* — James A English
(74) *Attorney, Agent, or Firm* — Harness, Dickey & Pierce, P.L.C.

(57) ABSTRACT

A vehicle suspension bushing assembly including an inner sleeve, a bearing, an intermediate sleeve, an outer sleeve, and a bushing. The inner sleeve extends longitudinally between first and second inner sleeve ends. The bearing extends annularly about the inner sleeve, the intermediate sleeve extends annularly about the bearing, and the outer sleeve extends annularly about the intermediate sleeve. The bushing is positioned radially between the outer sleeve and the intermediate sleeve. Axial retainers extend annularly about the first and second inner sleeve ends. The axial retainers are longitudinally moveable relative to the inner sleeve. The axial retainers have a preload feature including a flange segment that is resilient and deflects from an unbiased position when the axial retainers are in an uncompressed position to a biased position when the axial retainers are in a compressed position to apply a longitudinal preload force to the intermediate sleeve.

20 Claims, 6 Drawing Sheets

(56) References Cited

U.S. PATENT DOCUMENTS

| | | | |
|---|---|---|---|
| 5,058,867 A * | 10/1991 | Hadano | B60G 7/005 248/635 |
| 5,069,431 A * | 12/1991 | Kakimoto | B60G 7/02 267/141 |
| 5,143,456 A | 9/1992 | Jordens et al. | |
| 5,165,803 A | 11/1992 | Zivkovic | |
| 5,181,784 A * | 1/1993 | Jordens | B60G 7/02 384/222 |
| 5,261,748 A * | 11/1993 | Kameda | F16F 1/38 267/141 |
| 5,286,014 A | 2/1994 | Chakko | |
| 5,540,420 A | 7/1996 | Luzsicza | |
| 5,593,233 A * | 1/1997 | Kammel | B60G 7/02 384/222 |
| 5,887,859 A | 3/1999 | Hadano et al. | |
| 6,170,812 B1 | 1/2001 | Nicoles | |
| 6,435,757 B1 | 8/2002 | Casella | |
| 6,854,917 B2 | 2/2005 | Kraine, Jr. et al. | |
| 7,789,405 B2 | 9/2010 | Lie | |
| 8,037,573 B2 | 10/2011 | Bost, Jr. | |
| 8,579,510 B2 | 11/2013 | Noble et al. | |
| 8,616,773 B2 | 12/2013 | Thornhill | |
| 2002/0043749 A1* | 4/2002 | Hokazono | F16F 1/3814 267/140.12 |
| 2007/0290425 A1 | 12/2007 | Heuer et al. | |
| 2012/0175831 A1 | 7/2012 | Kieffer | |
| 2015/0210139 A1* | 7/2015 | Kuwabara | B60G 3/20 280/124.152 |
| 2015/0323031 A1* | 11/2015 | Yahata | F16F 1/3863 267/141.2 |

\* cited by examiner

VEHICLE SUSPENSION BUSHING ASSEMBLY AND METHOD OF ASSEMBLING THE SAME

FIELD

The subject disclosure relates to vehicle suspension bushing assemblies and to methods of assembling vehicle suspension bushing assemblies.

BACKGROUND

This section provides background information related to the present disclosure which is not necessarily prior art.

Automobiles, trucks, buses and other vehicles are commonly designed using independent front and/or rear suspension systems to connect unsprung components of the vehicle, such as the wheels and brakes, to the chassis of the vehicle. Independent suspension systems normally include an upper control arm, a lower control arm, and a hub or knuckle that supports one of the wheels. Each control arm is attached to a frame or other support structure of the vehicle using one or more bushing assemblies. The bushing assemblies decouple torsional input from other articulation directions. Each bushing assembly typically consists of an outer metal sleeve that is pressed into the control arm, an elastomeric bushing positioned within the outer metal sleeve, a thrust bearing that extends through the center of the elastomeric bushing, and an inner metal sleeve that extends through the center of the thrust bearing. The inner metal sleeve is connected to a bracket on the frame or other support structure of the vehicle. In some examples, a bolt extends through the inner metal sleeve and secures the control arm and the bushing assembly to the frame by mating with an appropriate bracket. As the vehicle travels, relative movement between the chassis and the unsprung components of the vehicle is accommodated by flexing of a coil spring, a torsion bar, an air spring, or by another resilient device. The flexing of the resilient device causes the ends of the control arms to pivot on the bushing assemblies.

The thrust bearing facilitates the pivotal motion of the inner metal sleeve relative to the outer metal sleeve and the elastomeric bushing. The elastomeric bushing operates to isolate the vehicle from shock. The elastomeric bushing, which is located between the outer metal sleeve and the thrust bearing, effectively isolates the frame of the vehicle from the unsprung components. In certain high load applications, the ends of the outer metal sleeve are curved or bent over the ends of the inner metal sleeve in order to further encapsulate the elastomeric bushing. The curving or bending of the ends of the outer metal sleeve and thus the further encapsulating of the elastomeric bushing improves the radial spring rate, the axial spring rate, the axial retention, and the durability of the elastomeric bushing.

While these elastomer isolated bushing assemblies have performed satisfactorily in the field, noise, vibration, and harshness (NVH) problems can occur because the thrust bearing has a tendency to move longitudinally relative to the inner metal sleeve, causing free play in the bushing assembly and a clicking noise. This free play can also accelerate wear within the bushing assembly and therefore can decrease service life. Thus, there remains a need for the development of new bushing assemblies with improvements in NVH performance and durability, while minimizing the manufacturing costs associated with bushing assemblies.

SUMMARY

This section provides a general summary of the disclosure and is not a comprehensive disclosure of its full scope or all of its features.

The subject disclosure relates to an improved vehicle suspension bushing assembly. The vehicle suspension bushing assembly disclosed herein includes an inner sleeve, a bearing, an intermediate sleeve, an outer sleeve, an axial retainer, and a bushing. The inner sleeve extends longitudinally between a first inner sleeve end and a second inner sleeve end and defines a longitudinal axis. The bearing extends annularly about the inner sleeve and the intermediate sleeve extends annularly about the bearing. The outer sleeve extends annularly about the intermediate sleeve in a radially spaced relationship. The bushing includes a body portion that is disposed radially between the outer sleeve and the intermediate sleeve. The vehicle suspension bushing assembly further includes at least one axial retainer extending annularly about one of the first inner sleeve end and the second inner sleeve end. The axial retainer is moveable in a longitudinal direction relative to the inner sleeve between an uncompressed position and a compressed position. The at least one axial retainer has a preload feature that is resilient. In operation, the preload feature of the axial retainer deflects from an unbiased position when the axial retainer is in the uncompressed position to a biased position when the axial retainer is in the compressed position. Because the preload feature of the axial retainer is resilient, the preload feature applies a longitudinal preload force to at least one of the intermediate sleeve and the bearing when the flange segment is in the biased position.

A method of assembling the vehicle suspension bushing assembly described above is also disclosed. The method includes the steps of: arranging the outer sleeve annularly about the intermediate sleeve such that the outer sleeve and the intermediate sleeve are radially spaced from one another and are co-axially aligned about the longitudinal axis, molding the bushing of elastomeric material between the outer sleeve and the intermediate sleeve, and pressing the bearing into the intermediate sleeve. The method also includes the step of inserting an inner sleeve into the bearing such that the inner sleeve and the bearing have a slip fit such that the inner sleeve is freely rotatable relative to the bearing, intermediate sleeve, bushing, and outer sleeve. The method further includes the step of pressing at least one axial retainer onto the inner sleeve to provide a press fit between the axial retainer and the inner sleeve and advancing the axial retainer to the uncompressed position. A flange segment of the axial retainer extends radially outwardly away from the longitudinal axis and the press fit allows the axial retainer to be translated longitudinally to the compressed position, where the flange segment of the axial retainer is pushed against the intermediate sleeve, deflects, and therefore applies the longitudinal preload force to the intermediate sleeve.

The longitudinal preload force provided by the preload feature of the axial retainer is particularly advantageous because the longitudinal preload force that is applied to the intermediate sleeve and/or the bearing eliminates free-play where the inner sleeve moves longitudinally relative to the intermediate sleeve and the bearing. This in turn reduces the noise, vibration, and harshness of the vehicle suspension bushing assembly and improves durability and service life without increasing manufacturing costs.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, a vehicle suspension bushing assembly 20 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
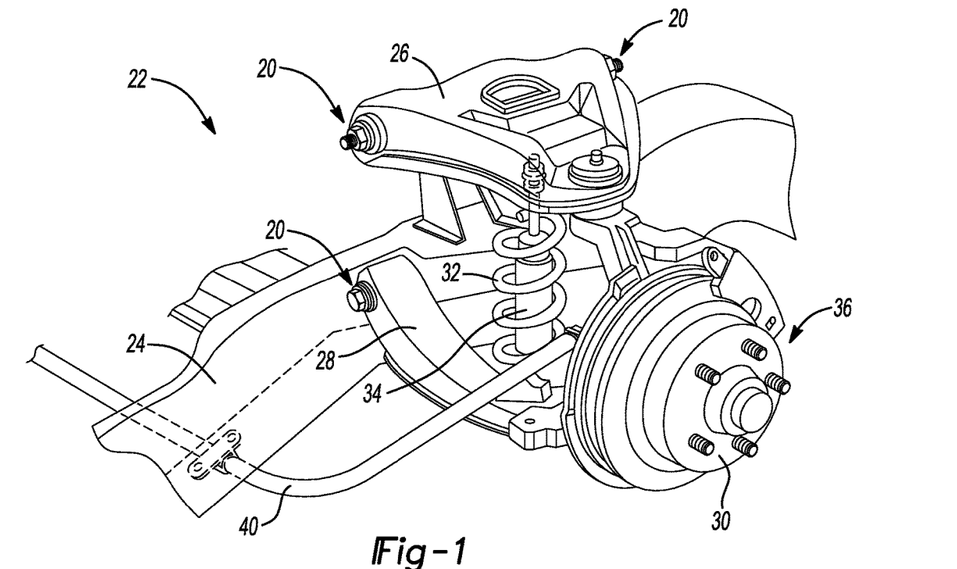
FIG. 1 is a side perspective view of an exemplary vehicle suspension system, which includes vehicle suspension bushing assemblies that have been constructed in accordance with the subject disclosure.

A typical vehicle suspension system 22 is illustrated in FIG. 1. The vehicle may be, without limitation, an automobile, truck, or bus. The vehicle suspension bushing assembly 20 constructed in accordance with the present disclosure is designated generally by reference numeral 20. The vehicle suspension system 22 comprises a frame 24 or other support structure of the vehicle, one or more vehicle suspension control arms 26, 28, a hub 30 or knuckle, a coil spring 32, a shock absorber 34, and a drive axle assembly 36. The frame 24 or other support structure supports a body (not shown) and other components of the vehicle, which are generally identified as the "sprung mass." The drive axle assembly 36 is attached to a differential or a transaxle (not shown) which receives torque from an engine (not show). The drive axle assembly 36 includes a pair of constant or non-constant velocity joints (not shown). One joint is attached to the differential and one joint is attached to the hub 30 or knuckle. A drive shaft (not shown) extends between the two joints. The engine transmits rotation and torque to the differential or transaxle, which transfers the rotation and torque from the engine to the hub 30 or knuckle through the drive axle assembly 36. A wheel (not shown) attached to the hub 30 or knuckle is driven by a drive axle assembly 36 through the hub 30 or knuckle. The constant or non-constant velocity joints permit the transmission of torque at various angles, which allows the vehicle suspension system 22 to undergo jounce and rebound motions while still transmitting torque from the differential or transaxle to the wheel(s) of the vehicle.

The coil spring 32 supports the load for the sprung mass of the vehicle and the shock absorber 34 dampens the movement of the wheel with respect to the frame 24 or other support structure as is well known in the art. A torque rod 40 or anti-roll bar can be disposed between the frame 24 or other support structure and the hub 30 or knuckle to assist in the control of the wheel with respect to the frame 24 or other supporting structure as is well known in the art. An upper control arm 26 and a lower control arm 28 are each attached to the frame 24 or other support structure using one or more of the vehicle suspension bushing assemblies 20 disclosed herein. Each of the vehicle suspension bushing assemblies 20 is disposed between one of the control arms 26, 28 and the frame 24 or other supporting structure to accommodate the motion between these two components and to isolate the sprung mass of the vehicle from shock and vibration.

While the vehicle suspension system 22 illustrated in FIG. 1 has two vehicle suspension bushing assemblies 20 disposed between the upper control arm 26 and the frame 24 and one vehicle suspension bushing assembly 20 disposed between the lower control arm 28 and the frame 24, it is within the scope of the present disclosure to utilize any number of the vehicle suspension bushing assemblies 20 disclosed herein between any two components that require one of the components to pivot with respect to the other component. In addition, while the vehicle suspension system 22 illustrated in FIG. 1 has three identical vehicle suspension bushing assemblies 20 disposed between the upper and lower control arms 26, 28 and the frame 24, it is within the scope of the present disclosure to utilize a different design for each of the vehicle suspension bushing assemblies 20. Also, while the vehicle suspension system 22 in FIG. 1 is illustrated as an independent suspension system, it is within the scope of the present disclosure to utilize the vehicle suspension bushing assembly 20 disclosed herein in other suspension designs including, but not limited to, leaf spring suspension systems.

Figure 2:
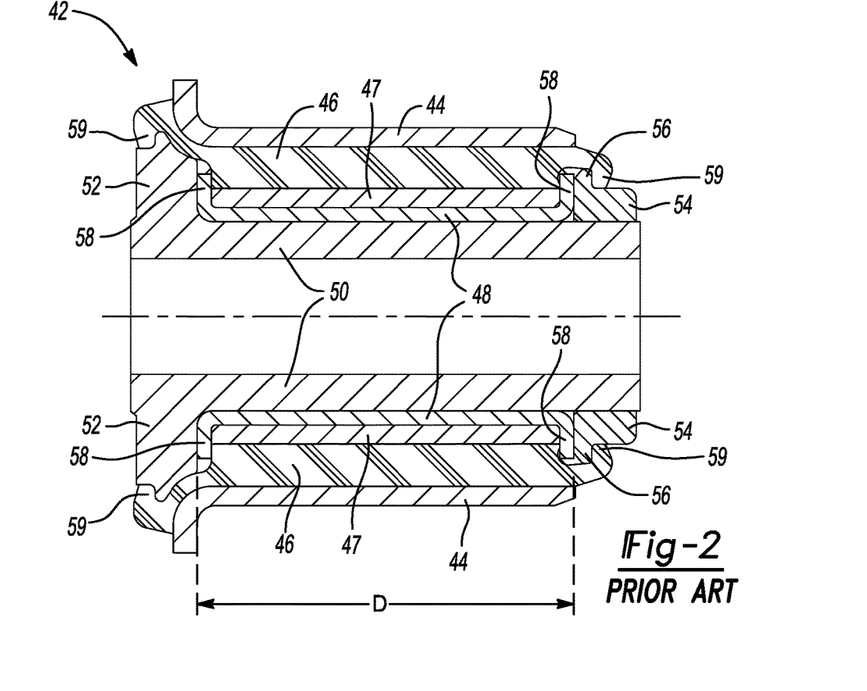
FIG. 2 is a side cross-sectional view of an exemplary vehicle suspension bushing assembly that is known in the prior art.

A prior art bushing assembly 42 is illustrated in FIG. 2. This bushing assembly 42 includes an outer metal sleeve 44, an elastomeric bushing 46 positioned within the outer metal sleeve 44, a middle sleeve 47 that extends through the center of the elastomeric bushing 46, a thrust bearing 48 that extends through the middle sleeve 47, and an inner metal sleeve 50 that extends through the center of the thrust bearing 48. The inner metal sleeve 50 has an integral flange 52 at one end and a retainer 54 at the other. The retainer 54 is made of metal and includes a rigid flange 56 that is not resilient or otherwise deflectable. The middle sleeve 47 is metal and is positioned radially between the thrust bearing 48 and the elastomeric bushing 46. The thrust bearing 48 is positioned radially between the middle sleeve 47 and the inner metal sleeve 50 and longitudinally between the integral flange 52 of the inner metal sleeve 50 and the rigid flange 56 of the retainer 54. The thrust bearing 48 includes outwardly turned ends 58 that abut the integral flange 52 of the inner metal sleeve 50 and the rigid flange 56 of the retainer 54. The middle sleeve 47 extends longitudinally between the outwardly turned ends 58 of the thrust bearing 48. When the bushing assembly 42 experiences axial forces and free play, the outwardly turned ends 58 of the thrust bearing 48 hit the integral flange 52 of the inner metal sleeve 50 and the rigid flange 56 of the retainer 54, which can produce noise and vibration. The elastomeric bushing 46 is disposed radially between the thrust bearing 48 and the outer metal sleeve 44. The elastomeric bushing 46 is overmolded and has dirt wipers 59 that extend longitudinally over a portion of the retainer 54 and the integral flange 52 of the inner metal sleeve 50 to seal the bushing assembly 42 from dirt, debris, and/or water.

It should be appreciated that there is no longitudinal preload force acting on the thrust bearing 48 in the bushing assembly 42 illustrated in FIG. 2. Free play can be minimized in this design by manufacturing very precise, tight tolerances between the thrust bearing 48, the inner metal sleeve 50, and the retainer 54. However, the manufacture of such tight tolerance components is expensive and the assembly process must be much more precise. For example, if a longitudinal spacing D between the integral flange 52 of the inner metal sleeve 50 and the rigid flange 56 of the retainer 54 is too small, then the clearances between the thrust bearing 48 and the integral flange 52 of the inner metal sleeve 50 and the rigid flange 56 of the retainer 54 will be too tight and the inner metal sleeve 50 will not be free to rotate (i.e. will not be torsionally free). On the other hand, if the longitudinal spacing D between the integral flange 52 of the inner metal sleeve 50 and the rigid flange 56 of the retainer 54 is too large, then the clearances between the thrust bearing 48 and the integral flange 52 of the inner metal sleeve 50 and the rigid flange 56 of the retainer 54 will be too loose and the thrust bearing 48 will be free to move longitudinally relative to the inner metal sleeve 50, causing the noise, vibration, and harshness problems described above. The dirt wipers 59 of the elastomeric bushing 46 are also prone to wear because the integral flange 52 of the inner metal sleeve 50 and the retainer 54 are made of metal and rotate relative to the dirt wipers 59, which are made of the same elastomeric material as the rest of the elastomeric bushing 46.

The vehicle suspension bushing assembly 20 constructed in accordance with the subject disclosure is illustrated in FIGS. 3-7, which is an improvement over the bushing assembly 42 shown in FIG. 2. The vehicle suspension bushing assembly 20 includes an inner sleeve 60, a bearing 62, an intermediate sleeve 64, a bushing 66, and an outer sleeve 68. The inner sleeve 60 extends longitudinally between a first inner sleeve end 70 and a second inner sleeve end 72. The inner sleeve 60 has a first inner sleeve end face 74 at the first inner sleeve end 70 and a second inner sleeve end face 76 at the second inner sleeve end 72. The inner sleeve 60 also has an inner sleeve outside surface 78 and an inner sleeve inside surface 80, opposite the inner sleeve outside surface 78, that defines a longitudinal bore 82. The longitudinal bore 82 extends co-axially within the inner sleeve 60 along a longitudinal axis 84. It should be understood that the terms "longitudinal" and "longitudinally" used in this disclosure describe elements that are generally arranged or directed in a direction that is parallel to the longitudinal axis 84. It should also be appreciated that the inner sleeve 60 may have a variety of different shapes and configurations and may be made from a variety of different materials, all of which are considered to be within the scope of the subject disclosure. By way of example and without limitation, the inner sleeve 60 may have a cylindrical shape and may be made of a milled steel with a zinc-iron plating for corrosion resistance.

Figure 3:
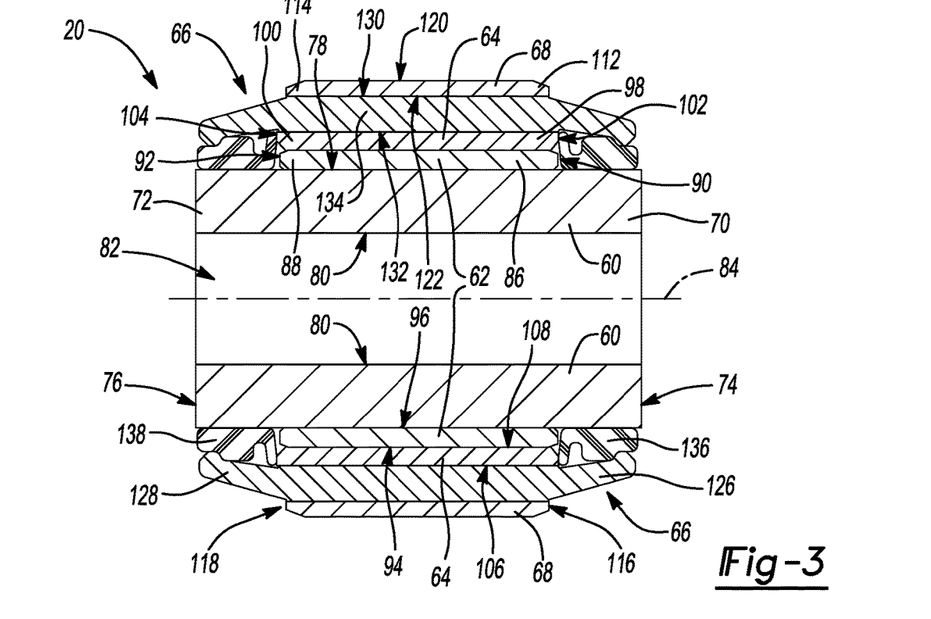
FIG. 3 is a side cross-sectional view of an exemplary vehicle suspension bushing assembly that is constructed in accordance with the subject disclosure.
Figure 4:
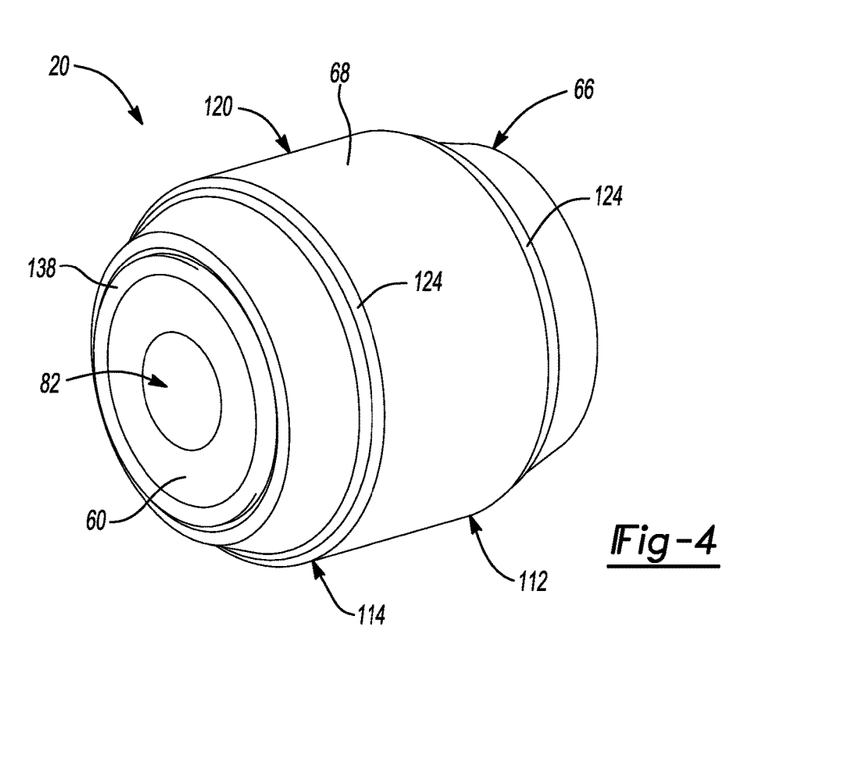
FIG. 4 is a side perspective view of the exemplary vehicle suspension bushing assembly illustrated in FIG. 3.

The bearing 62 of the vehicle suspension bushing assembly 20 extends annularly about the inner sleeve 60 and longitudinally between a first bearing end 86 and a second bearing end 88. The bearing 62 has a first bearing end face 90 at the first bearing end 86 and a second bearing end face 92 at the second bearing end 88. The bearing 62 also has an outside bearing surface 94 and an inside bearing surface 96, opposite the outside bearing surface 94, that abuts the inner sleeve outside surface 78 in a close tolerance slip fit (i.e., a close tolerance clearance fit). The slip fit between the inside bearing surface 96 and the inner sleeve outside surface 78 allows the inner sleeve 60 to freely rotate relative to the bearing 62. The bearing 62 may further include a longitudinal cut (not shown) extending longitudinally from the first bearing end 86 to the second bearing end 88 that runs parallel to the longitudinal axis 84. It should be appreciated that the bearing 62 may have a variety of different shapes and configurations and may be made from a variety of different materials, all of which are considered to be within the scope of the subject disclosure. By way of example and without limitation, the bearing 62 may have a cylindrical shape and may be made of milled steel backed with bronze. The bearing 62 may also have a lubricating coating applied to the inside bearing surface 96. The lubricating coating may be selected from a wide variety of different materials. By way of non-limiting example, the lubricating coating may be a polytetrafluoroethylene (PTFE) coating.

Figure 5:
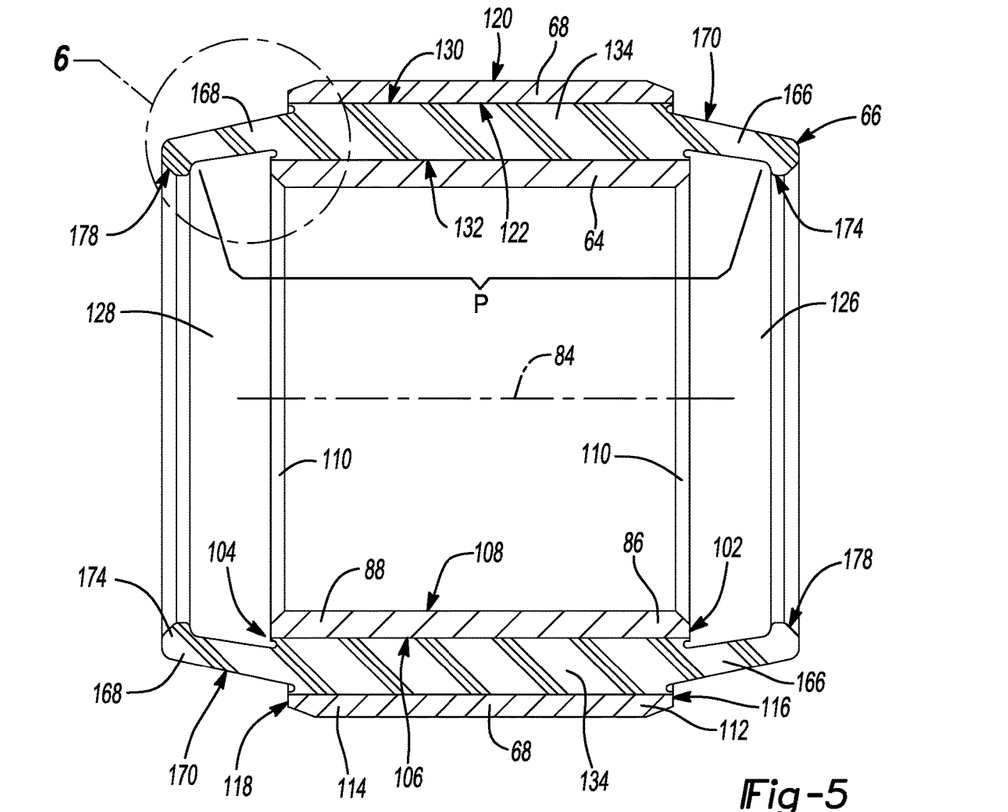
FIG. 5 is a side cross-sectional view of an outer sleeve, bushing, and intermediate sleeve of the exemplary vehicle suspension bushing assembly illustrated in FIG. 3.
Figure 6:
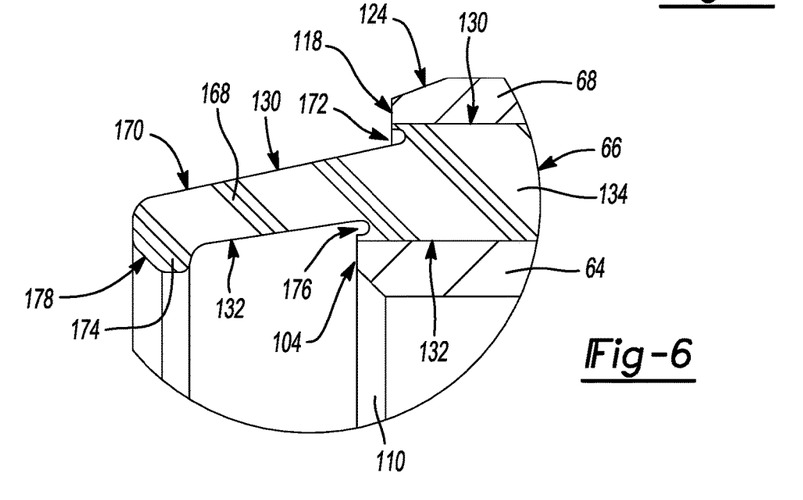
FIG. 6 is an enlarged side cross-sectional view of a seal portion of the bushing illustrated in FIG. 5.

The intermediate sleeve 64 of the vehicle suspension bushing assembly 20 extends annularly about the bearing 62 and longitudinally between a first intermediate sleeve end 98 and a second intermediate sleeve end 100. The intermediate sleeve 64 has a first intermediate sleeve end face 102 at the first intermediate sleeve end 98 and a second intermediate sleeve end face 104 at the second intermediate sleeve end 100. The intermediate sleeve 64 also has an intermediate sleeve outside surface 106 and an intermediate sleeve inside surface 108, opposite the intermediate sleeve outside surface 106, that abuts the outside bearing surface 94 in a press fit (i.e., an interference fit). The press fit between the intermediate sleeve inside surface 108 and the outside bearing surface 94 rotatably couples the intermediate sleeve 64 and the bearing 62 such that the intermediate sleeve 64 and the bearing 62 rotate together. As best seen in FIGS. 5 and 6, the first and second intermediate sleeve ends 98, 100 may optionally include inwardly directed chamfers 110 that face towards the longitudinal axis 84. It should be appreciated that the intermediate sleeve 64 may have a variety of different shapes and configurations and may be made from a variety of different materials, all of which are considered to be within the scope of the subject disclosure. By way of example and without limitation, the intermediate sleeve 64 may have a cylindrical shape and may be made of milled steel. It should also be appreciated that in some embodiments, the intermediate sleeve 64 may be eliminated entirely.

The outer sleeve 68 of the vehicle suspension bushing assembly 20 extends longitudinally between a first outer sleeve end 112 and a second outer sleeve end 114. The outer sleeve 68 has a first outer sleeve end face 116 at the first outer sleeve end 112 and a second outer sleeve end face 118 at the second outer sleeve end 114. The outer sleeve 68 also has an outer sleeve outside surface 120 and an outer sleeve inside surface 122 opposite the outer sleeve outside surface 120. The outer sleeve 68 and the intermediate sleeve 64 are co-axially arranged relative to the longitudinal axis 84 such that the outer sleeve 68 extends annularly about the intermediate sleeve 64 in a spaced relationship. Accordingly, the outer sleeve inside surface 122 faces the intermediate sleeve outside surface 106 and is radially spaced from the intermediate sleeve outside surface 106. Optionally, the first and second outer sleeve ends 112, 114 may have outwardly directed chamfers 124 that face away from the longitudinal axis 84. It should be appreciated that the outer sleeve 68 may have a variety of different shapes and configurations and may be made from a variety of different materials, all of which are considered to be within the scope of the subject disclosure. By way of example and without limitation, the outer sleeve 68 may have a cylindrical shape and may be made of milled steel.

The bushing 66 of the vehicle suspension assembly extends longitudinally between a first bushing end 126 and a second bushing end 128 and radially between an outside bushing surface 130 and an inside bushing surface 132. In operation, the bushing 66 mechanically decouples the intermediate sleeve 64, the bearing 62, and the inner sleeve 60 from the outer sleeve 68. The bushing 66 includes a body portion 134 that is disposed radially between the outer sleeve 68 and the intermediate sleeve 64 such that at least a portion of the outside bushing surface 130 abuts the outer sleeve inside surface 122 and at least a portion of the inside bushing surface 132 abuts the intermediate sleeve outside surface 106. The bushing 66 rotatably couples the outer sleeve 68 and the intermediate sleeve 64 such that the outer sleeve 68, the bushing 66, and the intermediate sleeve 64 all rotate together. Preferably, the bushing 66 is molded or overmolded between the outer sleeve 68 and the intermediate sleeve 64. It should be appreciated that the bushing 66 may have a variety of different shapes and configurations and may be made from a variety of different materials, all of which are considered to be within the scope of the subject disclosure. Notwithstanding, the bushing 66 must be made in a configuration and material that is resilient and capable of deflecting and dampening vibrations. By way of example and without limitation, the bushing 66 may be made of an elastomeric material such as natural rubber.

In operation, the outer sleeve 68, the bushing 66, the intermediate sleeve 64, and the bearing 62 are arranged to rotate together as a single unit, while the inner sleeve 60 remains free to rotate relative to the outer sleeve 68, the bushing 66, the intermediate sleeve 64, and the bearing 62. The vehicle suspension bushing assembly 20 further includes one or more axial retainers 136, 138 extending annularly about one or both of the first inner sleeve end 70 and the second inner sleeve end 72. In configuration illustrated in FIGS. 3-7, the one or more axial retainers 136, 138 includes a first axial retainer 136 extending annularly about the first inner sleeve end 70 and a second axial retainer 138 extending annularly about the second inner sleeve end 72. However, it should be appreciate that some embodiments may utilize a single axial retainer 136 or more than two axial retainers 136, 138.

Figure 7:
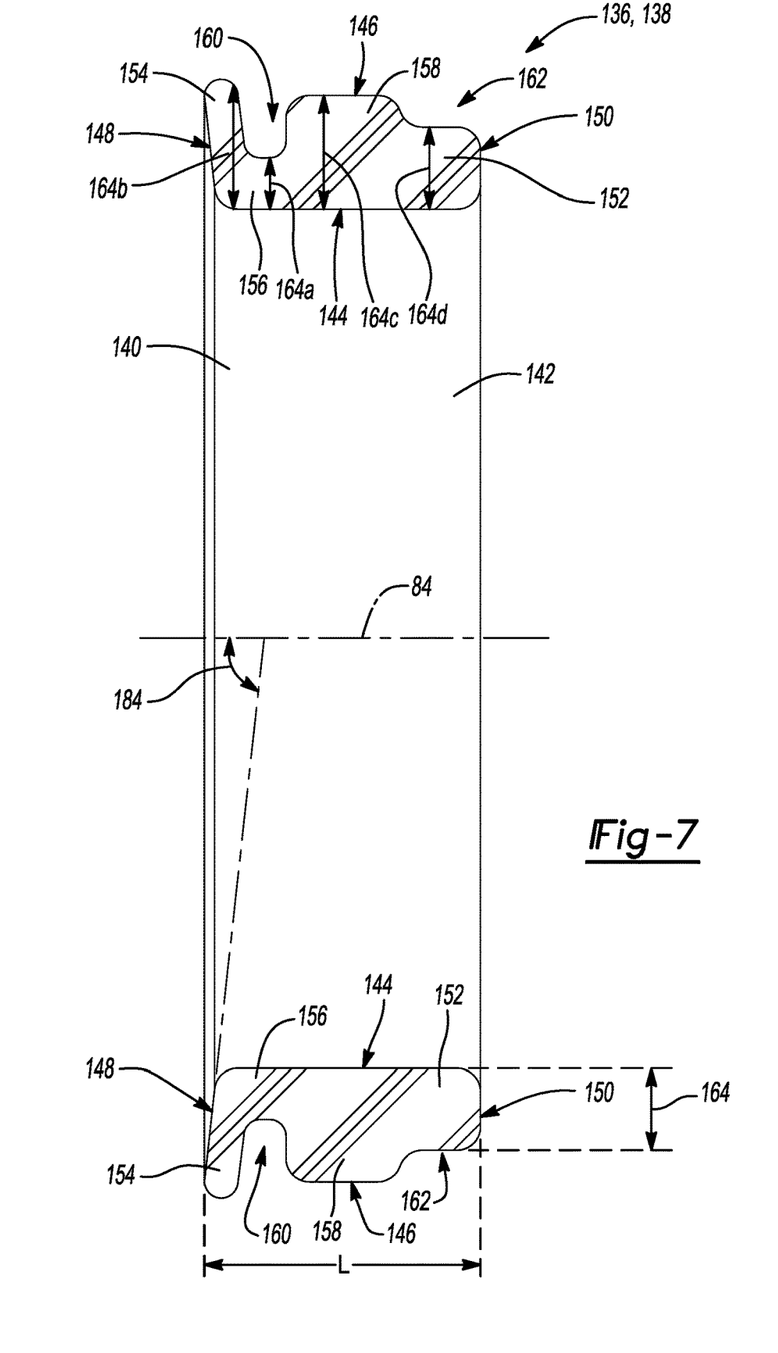
FIG. 7 is a side cross-sectional view of an axial retainer of the exemplary vehicle suspension bushing assembly illustrated in FIG. 3.

With reference to FIG. 7, each of the axial retainers 136, 138 extends longitudinally along a longitudinal length L between an internal axial retainer end 140 and an external axial retainer end 142. The longitudinal length L is measured in a direction parallel to the longitudinal axis 84. Each of the axial retainers 136, 138 includes an axial retainer inside surface 144, an axial retainer outside surface 146 opposite the axial retainer inside surface 144, an internal axial retainer end face 148 at the internal axial retainer end 140, and an external axial retainer end face 150 at the external axial retainer end 142. Each of the axial retainers 136, 138 may further include an end segment 152 at the external axial retainer end 142, a flange segment 154 at the internal axial retainer end 140, a hinge segment 156 adjacent the flange segment 154, and an enlarged segment 158 adjacent the end segment 152. The axial retainer inside surface 144 may be cylindrical in shape and the axial retainer outside surface 146 may include an annular groove 160 at the hinge segment 156 and an annular step 162 at the end segment 152 such that each of the axial retainers 136, 138 has a radial thickness 164 that varies along the longitudinal length L of the axial retainers 136, 138. The flange segment 154 of each of the axial retainers 136, 138 extends radially outwardly away from the longitudinal axis 84. The radial thickness 164a of the axial retainers 136, 138 is less at the hinge segment 156 than the radial thickness 164b at the flange segment 154 and the radial thickness 164c at the enlarged segment 158 due to the annular groove 160. Similarly, the radial thickness 164d of the axial retainers 136, 138 is less at the end segment 152 than the radial thickness 164c at the enlarged segment 158 due to the annular step 162.

As best seen in FIGS. 5 and 6, the bushing 66 includes one or more seal portions 166, 168 that extend longitudinally beyond the outer sleeve 68, the intermediate sleeve 64, and the bearing 62. The one of more seal portions 166, 168 include a first seal portion 166 at the first bushing end 126 and a second seal portion 168 at the second bushing end 128. Each of the seal portions 166, 168 may include a tapered face 170 and an outside surface undercut 172 along the outside bushing surface 130. Each of the seal portions 166, 168 may also include a lip 174 extending radially inwardly towards the longitudinal axis 84 that is longitudinally aligned with and received by the annular step 162 of the axial retainers 136, 138 and an inside surface undercut 176 disposed along the inside bushing surface 132. The lip 174 may include a chamfered edge 178 disposed on the lip 174 adjacent the inside bushing surface 132 that faces the longitudinal axis 84 and guides the lip 174 of the seal portions 166, 168 up over the flange segment 154 and the enlarged segment 158 of the axial retainers 136, 138 when the axial retainers 136, 138 are installed on the inner sleeve 60. Together, the lip 174 of the seal portions 166, 168 form an annular pocket P along the inside bushing surface 132 that receives the enlarged segment 158 of the axial retainer 54, the flange segment 154 of the axial retainer 54, and the intermediate sleeve 64.

Figure 8A:
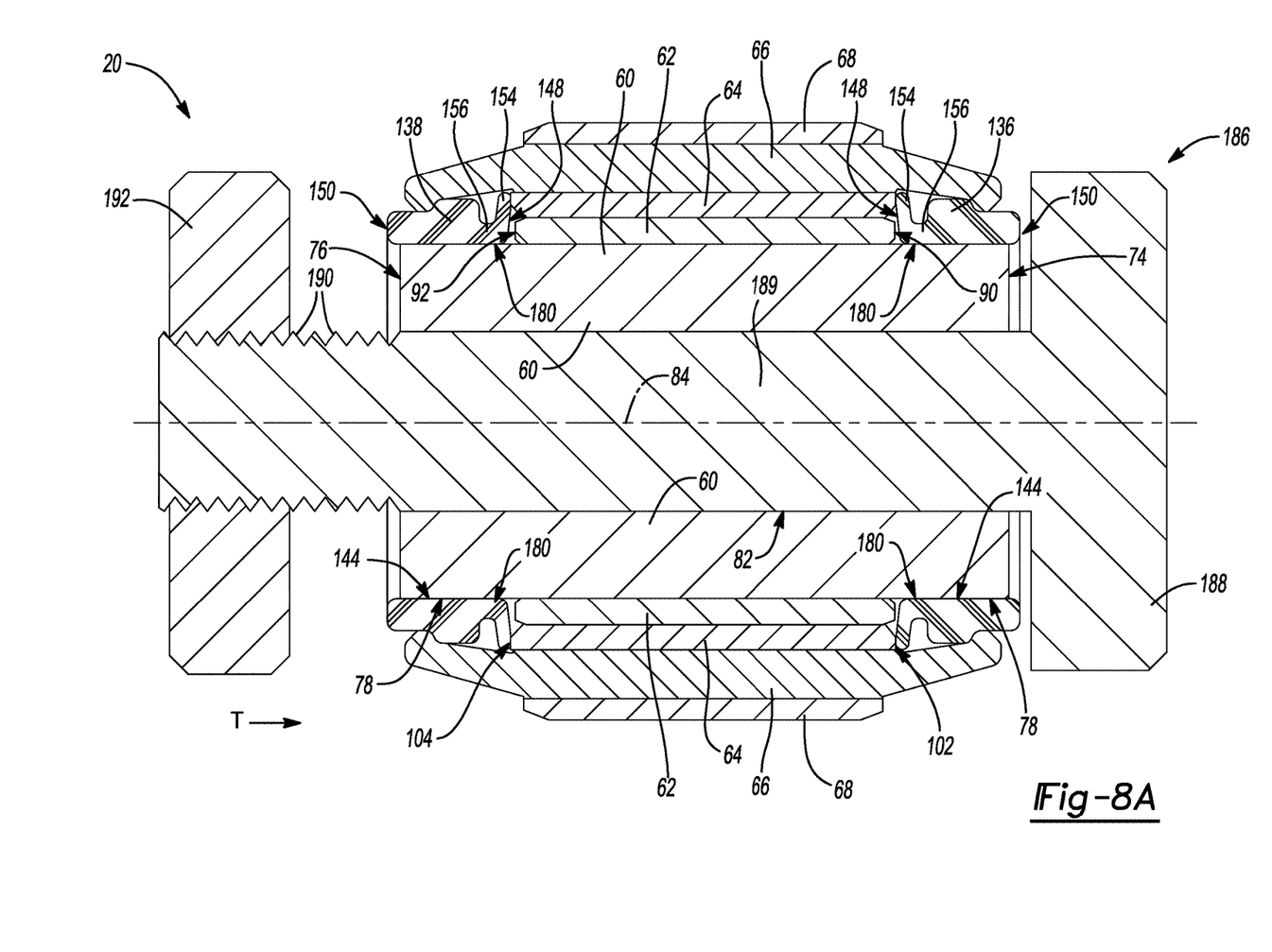
FIG. 8A is a side cross-sectional view of the exemplary vehicle suspension bushing assembly illustrated in FIG. 3 where a connection member has been inserted into an inner sleeve of the vehicle suspension bushing assembly and the axial retainers are shown in an uncompressed position.
Figure 8B:
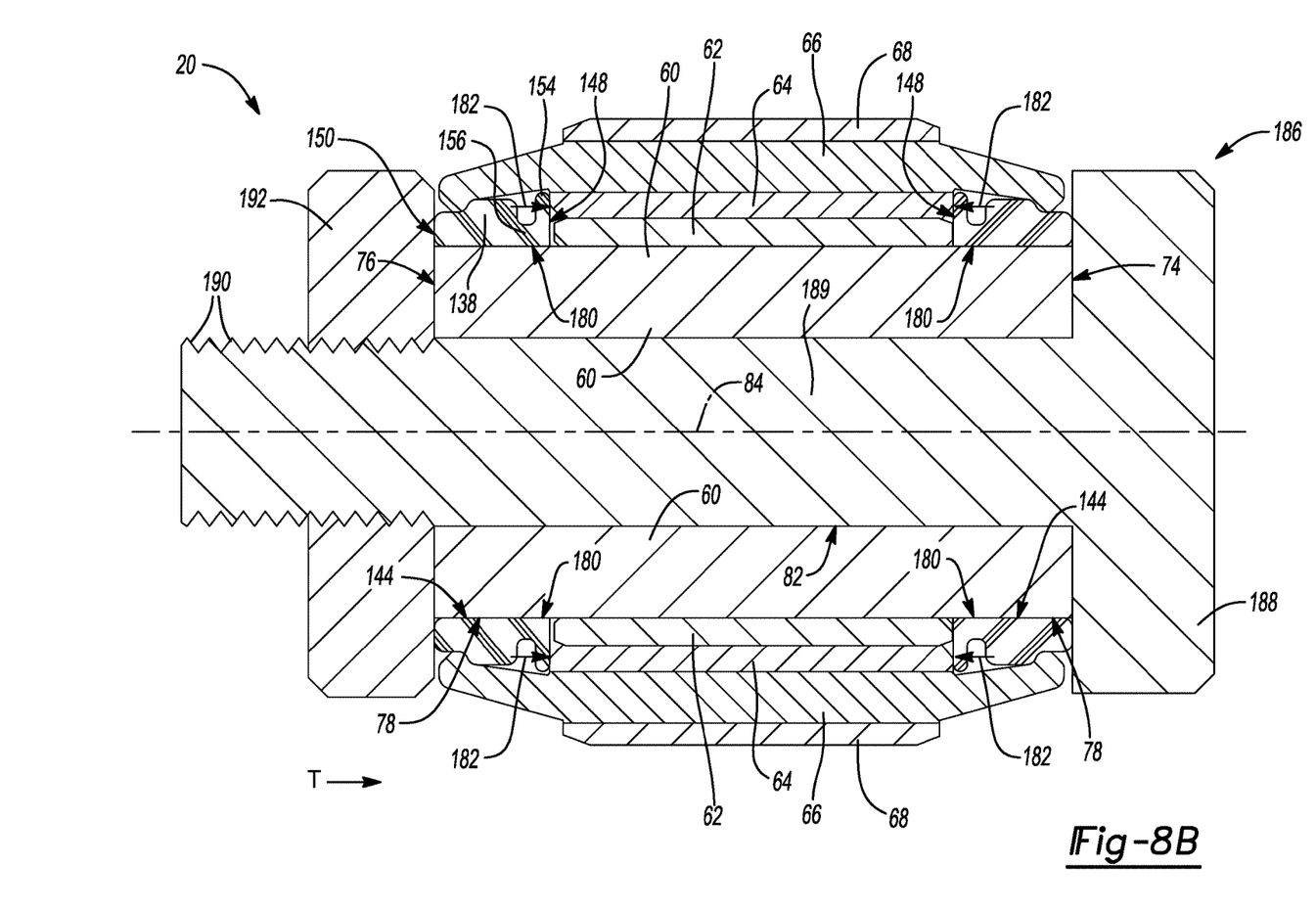
FIG. 8B is a side cross-sectional view of the exemplary vehicle suspension bushing assembly illustrated in FIG. 8A where a nut on the connection member has been tightened to move the axial retainers to a compressed position.

As shown in FIGS. 8A and 8B, the internal axial retainer end face 148 of the first axial retainer 136 abuts the first intermediate sleeve end face 102 and the internal axial retainer end face 148 of the second axial retainer 138 abuts the second intermediate sleeve end face 104 when the vehicle suspension bearing 62 assembly is fully assembled. Furthermore, the external axial retainer end face 150 of the first axial retainer 136 may project (i.e. extend) longitudinally beyond the first inner sleeve end face 74 and the external axial retainer end face 150 of the second axial retainer 138 may project (i.e. extend) longitudinally beyond the second inner sleeve end face 76 prior to installation of the vehicle suspension bushing assembly 20 in the vehicle suspension control arm.

The axial retainer inside surface 144 abuts the inner sleeve outside surface 78 in a press fit (i.e. an interference fit) such that each of the axial retainers 136, 138 rotate with the inner sleeve 60 while remaining longitudinally moveable relative to the inner sleeve 60 between an uncompressed position (FIG. 8A) and a compressed position (FIG. 8B). As shown in FIGS. 8A and 8B, the axial retainers 136, 138 move towards the intermediate sleeve 64 when pushed from the uncompressed position to the compressed position.

The flange segment 154 and/or the hinge segment 156 of the axial retainers 136, 138 is resilient, form a preload feature 180 that is configured to apply a longitudinal preload force 182 to the intermediate sleeve 64 when the flange segment 154 of the axial retainer 54 is deflected back (FIG. 8B) towards the external axial retainer end 142 as the axial retainers 136, 138 move longitudinally from the uncompressed position to the compressed position. In operation, the flange segment 154 deflects from an unbiased position (FIG. 8A) when the axial retainers 136, 138 are in the uncompressed position to a biased position (FIG. 8B) when the axial retainers 136, 138 are in the compressed position. When the axial retainers 136, 138 are in the compressed position, the internal axial retainer end face 148 of the flange segment 154 of the first axial retainer 136 contacts and is pushed against the first intermediate sleeve end face 102 and the internal axial retainer end face 148 of the second axial retainer 138 contacts and is pushed against the second intermediate sleeve end face 104. Because the flange segment 154 of the axial retainers 136, 138 is resilient, the flange segment 154 applies the longitudinal preload force 182 to the intermediate sleeve 64 when the flange segment 154 is in the biased position. The longitudinal preload force 182 is applied by each of the axial retainers 136, 138 to the intermediate sleeve 64 in opposite directions that act parallel to the longitudinal axis 84. Advantageously, the longitudinal preload force 182 acts to keep the intermediate sleeve 64 longitudinally centered within the vehicle suspension bushing assembly 20. Because the outside bearing surface 94 and the intermediate sleeve inside surface 108 are arranged in a press fit, the longitudinal preload force 182 that the axial retainers 136, 138 apply to the intermediate sleeve 64 also keeps the bearing 62 longitudinally centered within the vehicle suspension bushing assembly 20. As a result, the vehicle suspension bushing assembly 20 is less prone to free play along the longitudinal axis 84, resulting in reduced noise, vibration, and harshness and improved durability and service life. In addition, because the longitudinal preload force 182 keeps the intermediate sleeve 64 and the bearing 62 longitudinally centered within the vehicle suspension bushing assembly 20 eliminate longitudinal free-play instead of relying on tight tolerances between parts, precise, tight tolerances between the inner sleeve 60, the bearing 62, the intermediate sleeve 64, and the axial retainers 136, 138 are not required. This makes the vehicle suspension bushing assembly 20 disclosed herein easier and cheaper to manufacture and assemble compared to prior art bushing assemblies.

With reference to FIGS. 7, 8A, and 8B, the internal axial retainer end face 148 may be arranged at an inwardly facing angle 184 that is less than ninety degrees relative to the longitudinal axis 84. This gives the internal axial retainer end face 148 an inward taper that allows the internal axial retainer end face 148 of each of the axial retainers 136, 138 to be spaced away from the first bearing end face 90 and the second bearing end face 92 when the internal axial retainer end face 148 of the first and second axial retainers 136, 138 are in contact with the first and second intermediate sleeve end faces 102, 104. Advantageously, this arrangement reduces friction and wear because the internal axial retainer end face 148 of the first and second axial retainers 136, 138 are only in contact with the first and second intermediate sleeve end faces 102, 104. While the inwardly facing angle 184 of the internal axial retainer end face 148 may be any angle between 90 degrees and 0 degrees, the inwardly facing angle 184 may preferably equal 83.74 degrees. However, it should be appreciated that internal axial retainer end face 148 may contact only the first and second intermediate sleeve ends 98, 100, only the first and second bearing ends 86, 88, or both the first and second bearing ends 86, 88 and the first and second intermediate sleeve ends 98, 100. As a result, the preload feature 180 may apply the longitudinal preload force 182 directly to the intermediate sleeve 64, directly to the bearing 62, or directly to both the bearing 62 and the intermediate sleeve 64. In embodiments where the intermediate sleeve 64 is eliminated, the preload feature 180 applies the longitudinal preload force 182 directly to the bearing 62.

It should be appreciated that the axial retainers 136, 138 may have a variety of different shapes and configurations and may be made from a variety of different materials, all of which are considered to be within the scope of the subject disclosure. For example and without limitation, the preload feature 180 of the axial retainers 136, 138 may have an alternative shape where the axial retainers 136, 138 have a bent or U-shaped segment (not shown) between the internal and external axial retainer ends 140, 142 that allows the longitudinal length L of the axial retainers 136, 138 to decrease when the axial retainers 136, 138 are compressed. In this configuration, the flange segment 154, the hinge segment 156, and/or the enlarged segment 158 of the axial retainers 136, 138 may be eliminated or modified. By way of example and without limitation, the axial retainers 136, 138 may be made of a lubricated polymeric material such as nylon, acetal, and/or high molecular weight polymers with a lubricant coating of polytetrafluoroethylene (PTFE). Alternatively, the axial retainers 136, 138 may be made of a non-metallic material and a metallic material. For example, the non-metallic material may be present at the end segment 152 to reduce wear between the lip 174 of the first and second seal portions 166, 168 of the bushing 66 and at the hinge segment 156 to provide resiliency, while the metallic material may be present at the internal axial retainer end face 148 to reduce wear on the flange segment 154, which rotates relative to and contacts the first and second bearing ends 86, 88 and/or the first and second intermediate sleeve ends 98, 100. Alternatively, a metal washer or other intermediate component (not shown) may be positioned between the internal axial retainer end face 148 and the first and second bearing ends 86, 88 and/or the first and second intermediate sleeve ends 98, 100 to minimize wear. In such a configuration, the preload feature 180 of the axial retainers 136, 138 applies the longitudinal preload force 182 to the first and second bearing ends 86, 88 and/or the first and second intermediate sleeve ends 98, 100 through this metal washer or other intermediate component.

With reference to FIGS. 1, 8A, and 8B, the vehicle bushing assembly 42 is shown in a pre-installed and a fully installed state, respectively. A connection member 186 is received in and extends through the longitudinal bore 82 in the inner sleeve 60 when the vehicle suspension bushing assembly 20 is assembled. The connection member 186 is configured to be connected to the vehicle suspension control arm 26, 28 and/or the frame 24 of the vehicle such that the connection member 186 holds the vehicle bushing assembly 42 in place in the vehicle suspension control arm 26, 28. It should be appreciated that the connection member 186 is a fastener and may be provided in a variety of different configurations. In the non-limiting example illustrated in FIGS. 8A and 8B, the connection member 186 is a bolt and includes a bolt head 188, a shaft 189 with threads 190, and a nut 192 threadingly engaged with the threads 190 of the shaft 38. The bolt head 188 is disposed adjacent to the first inner sleeve end face 74, the shaft 189 extends through the longitudinal bore 82 in the inner sleeve 60, and the nut 192 is disposed adjacent to the second inner sleeve end face 76 when the vehicle suspension bushing assembly 20 is installed in the vehicle suspension control arm 26, 28. In operation, the axial retainers 136, 138 translate from the uncompressed position (FIG. 8A) to the compressed position (FIG. 8B) when the nut 192 threadingly engages the shaft 189 of the connection member 186 (i.e. when the nut 192 is tightened by rotating the nut 192 on the threads 190 of the shaft 189 to advance the nut 192 in a tightening direction T that is parallel to the longitudinal axis 84 and points towards the inner sleeve 60). As shown in FIG. 8B, when the nut 192 is tightened, the bolt head 188 comes into contact with and pushes against the external axial retainer end face 150 of the first axial retainer 136 and the nut 192 comes into contact with and pushes against the external axial retainer end face 150 of the second axial retainer 138 and positions the axial retainers 136, 138 in the compressed position. This in turn moves the flange segments 154 of the axial retainers 136, 138 to the biased position such that the preload feature 180 of the axial retainers 136, 138 applies the longitudinal preload force 182 to the intermediate sleeve 64 in the manner described above.

A method of assembling the vehicle suspension bushing assembly 20 set forth above will now be described. The method includes the step of arranging the outer sleeve 68 annularly about the intermediate sleeve 64 such that the outer sleeve 68 and the intermediate sleeve 64 are radially spaced from one another and are co-axially aligned about the longitudinal axis 84. The method proceeds with the step of molding the bushing 66 of elastomeric material between the outer sleeve 68 and the intermediate sleeve 64. During the molding step, the bushing 66 is molded to include the body portion 134 and the one or more seal portions 166, 168. As explained above, the seal portions 166, 168 extend longitudinally beyond the outer sleeve 68 and the intermediate sleeve 64 of the vehicle suspension bushing assembly 20. The method continues with the steps of pressing the bearing 62 into the intermediate sleeve 64 such that the bearing 62 is press fit into the intermediate sleeve 64 and inserting the inner sleeve 60 into the bearing 62 such that the inner sleeve 60 and the bearing 62 have a slip fit. As a result of this construction, the inner sleeve 60 is freely rotatable relative to the bearing 62, intermediate sleeve 64, bushing 66, and outer sleeve 68.

The method also includes the step of pressing the one or more axial retainers 136, 138 onto the inner sleeve 60 to provide a press fit between the axial retainers 136, 138 and the inner sleeve 60. During this step, the axial retainers 136, 138 are advanced (i.e. placed) in the uncompressed position. As explained above, each of the axial retainers 136, 138 includes the hinge segment 156 and the flange segment 154 that extends radially outwardly from the hinge segment 156 and away from the longitudinal axis 84. The method further includes the steps of installing the vehicle suspension bushing assembly 20 in the vehicle suspension control arm 26, 28 and inserting the connection member 186 into the inner sleeve 60. As previously noted the connection member 186 may include a bolt head 188 and a shaft 38 with threads 190. The method proceeds with the step of threading the nut 192 onto the shaft 38 of the connection member 186 and tightening the nut 192 in the tightening direction T to push the bolt head 188 against the first axial retainer 136 and the nut 192 against the second axial retainer 138. During this step, the axial retainers 136, 138 are pushed longitudinally towards the intermediate sleeve 64 to the compressed position. As explained above, this step causes the flange segment 154 of the axial retainers 136, 138 to deflect and apply a longitudinal preload force 182 to the intermediate sleeve 64 as the flange segment 154 of the axial retainers 136, 138 contacts and is pushed against the intermediate sleeve 64.

Many modifications and variations of the present disclosure are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. A vehicle suspension bushing assembly including:
an inner sleeve extending longitudinally between a first inner sleeve end and a second inner sleeve end, said inner sleeve defining a longitudinal axis;
a bearing extending annularly about said inner sleeve;
an intermediate sleeve extending annularly about said bearing;
an outer sleeve extending annularly about said intermediate sleeve in a radially spaced relationship;
a bushing including a body portion that is disposed radially between said outer sleeve and said intermediate sleeve;
at least one axial retainer extending annularly about one of said first inner sleeve end and said second inner sleeve end, said axial retainer being separate from and not contiguously formed with said bushing and longitudinally moveable relative to said inner sleeve between an uncompressed position and a compressed position; and
said at least one axial retainer having a preload feature that is resilient and operable to deflect from an unbiased position when said axial retainer is in said uncompressed position to a biased position when said axial retainer is in said compressed position, said preload feature of said axial retainer operably applying a longitudinal preload force to at least one of said intermediate sleeve and said bearing in said biased position.

2. The vehicle suspension bushing assembly set forth in claim 1, wherein said preload feature of said axial retainer includes a flange segment that extends radially outwardly away from said longitudinal axis.

3. The vehicle suspension bushing assembly set forth in claim 2, wherein said axial retainer includes an axial retainer inside surface, an axial retainer outside surface, a hinge segment adjacent said flange segment, and an enlarged segment adjacent said hinge segment, said axial retainer inside surface being cylindrical in shape, and said axial retainer outside surface including an annular groove at said hinge segment such that said axial retainer has a radial thickness that varies along a longitudinal length of said axial retainer.

4. The vehicle suspension bushing assembly set forth in claim 3, wherein said axial retainer includes an end segment adjacent said enlarged segment, said axial retainer outside surface includes an annular step at said end segment, and said radial thickness of said axial retainer is less at said end segment than said radial thickness at said enlarged segment due to said annular step.

5. The vehicle suspension bushing assembly set forth in claim 4, wherein said bushing includes at least one seal portion that extends longitudinally beyond said outer sleeve, said intermediate sleeve, and said bearing, said seal portion including a lip extending radially inwardly towards said inner sleeve that is longitudinally aligned with and received by said annular step of said axial retainer.

6. The vehicle suspension bushing assembly set forth in claim 3, wherein said radial thickness of said axial retainer is less at said hinge segment than said radial thickness at said flange segment and said radial thickness at said enlarged segment due to said annular groove.

7. The vehicle suspension bushing assembly set forth in claim 2, wherein said axial retainer includes an internal axial retainer end face at said flange segment and an external axial retainer end face opposite said internal axial retainer end face, said internal axial retainer end face configured to abut said intermediate sleeve when said vehicle suspension bushing assembly is assembled.

8. The vehicle suspension bushing assembly set forth in claim 7, wherein said internal axial retainer end face is arranged at an inwardly facing angle that is less than ninety degrees relative to said longitudinal axis such that said internal axial retainer end face angles away from and does not contact said bearing.

9. The vehicle suspension bushing assembly set forth in claim 7, wherein said external axial retainer end face projects longitudinally beyond one of said first inner sleeve end and said second inner sleeve end prior to installation of said vehicle suspension bushing assembly.

10. The vehicle suspension bushing assembly set forth in claim 1, wherein said at least one axial retainer includes a first axial retainer extending annularly about said first inner sleeve end and a second axial retainer extending annularly about said second inner sleeve end.

11. The vehicle suspension bushing assembly set forth in claim 10, wherein said bushing includes a first seal portion and a second seal portion that extend longitudinally beyond said outer sleeve, said intermediate sleeve, and said bearing and over at least part of said first axial retainer and at least part of said second axial retainer.

12. The vehicle suspension bushing assembly set forth in claim 1, wherein said axial retainer includes an axial retainer inside surface and said inner sleeve includes an inner sleeve outside surface that abuts said axial retainer inside surface in a press fit such that said axial retainer rotates with said inner sleeve while remaining longitudinally movable relative to said inner sleeve between said uncompressed position and said compressed position.

13. The vehicle suspension bushing assembly set forth in claim 12, wherein said outer sleeve includes an outer sleeve inside surface and said bushing includes an outside bushing surface that abuts said outer sleeve inside surface, said intermediate sleeve includes an intermediate sleeve outside surface and said bushing includes an inside bushing surface that abuts said intermediate sleeve outside surface, and said intermediate sleeve includes an intermediate sleeve inside surface and said bearing includes an outside bearing surface that abuts said intermediate sleeve inside surface in a press fit such that said outer sleeve, said bushing, said intermediate sleeve, and said bearing all rotate together as a single rotational unit, and wherein said bearing includes an inside bearing surface that abuts said inner sleeve outside surface in a slip fit such that said inner sleeve and said axial retainer remain free to rotate relative to said outer sleeve, said bushing, said intermediate sleeve, and said bearing.

14. The vehicle suspension bushing assembly set forth in claim 1, wherein said axial retainer is made of at least one polymeric material.

15. The vehicle suspension bushing assembly set forth in claim 1, wherein longitudinal movement of said axial retainer relative to said inner sleeve between said uncompressed position and said compressed position occurs in a direction parallel to said longitudinal axis.

16. A vehicle suspension bushing assembly including:
- an inner sleeve extending longitudinally between a first inner sleeve end and a second inner sleeve end, said inner sleeve including a longitudinal bore that extends within said inner sleeve along a longitudinal axis;
- a bearing extending annularly about said inner sleeve;
- an intermediate sleeve extending annularly about said bearing;
- an outer sleeve extending annularly about said intermediate sleeve in a radially spaced relationship, said outer sleeve and said intermediate sleeve being co-axially arranged relative to said longitudinal axis;
- a bushing including a body portion that is disposed radially between said outer sleeve and said intermediate sleeve;
- a vehicle suspension control arm;
- a connection member received in and extending through said longitudinal bore in said inner sleeve that is configured to be connected to said vehicle suspension control arm;
- at least one axial retainer extending annularly about one of said first inner sleeve end and said second inner sleeve end, said axial retainer being not contiguously formed with said bushing and longitudinally moveable relative to said inner sleeve between an uncompressed position and a compressed position; and
- said at least one axial retainer having a preload feature including a flange segment extending radially outwardly away from said longitudinal axis that is resilient and configured to apply a longitudinal preload force to said intermediate sleeve when said flange segment of said axial retainer is pushed against said intermediate sleeve and deflects as said axial retainer moves longitudinally from said uncompressed position to said compressed position.

17. The vehicle suspension bushing assembly set forth in claim 16, wherein said connection member is a bolt and includes a bolt head, a shaft with threads, and a nut threadingly engaged with said threads of said shaft in an arrangement where said bolt head is disposed adjacent to said first inner sleeve end, said shaft extends through said longitudinal bore in said inner sleeve, and said nut is disposed adjacent to said second inner sleeve end.

18. The vehicle suspension bushing assembly set forth in claim 17, wherein said axial retainer moves longitudinally from said uncompressed position to said compressed position in response to said nut threadingly engaging said shaft of said connection member and one of said bolt head and said nut abutting and pushing against said axial retainer as said vehicle suspension bushing assembly is installed.

19. A method of assembling a vehicle suspension bushing assembly comprising the steps of:
- arranging an outer sleeve annularly about an intermediate sleeve such that the outer sleeve and the intermediate sleeve are radially spaced from one another and are co-axially aligned about a longitudinal axis;
- molding a bushing of elastomeric material between the outer sleeve and the intermediate sleeve;
- pressing a bearing into the intermediate sleeve;
- inserting an inner sleeve into the bearing such that the inner sleeve and the bearing have a slip fit and the inner sleeve is freely rotatable relative to the bearing, intermediate sleeve, bushing, and outer sleeve; and
- pressing at least one axial retainer directly onto the inner sleeve to provide a press fit between the axial retainer and the inner sleeve and advancing the axial retainer to an uncompressed position, the axial retainer including a flange segment that extends radially outwardly away from said longitudinal axis, and the press fit allowing the axial retainer to be translated longitudinally to a compressed position where the flange segment of the axial retainer is pushed against the intermediate sleeve and deflects, applying a longitudinal preload force to the intermediate sleeve.

20. The method set forth in claim 19, further comprising the steps of:
- installing the vehicle suspension bushing assembly in a vehicle suspension control arm;
- inserting a connection member into the inner sleeve, the connection member including a bolt head and a shaft with threads; and
- threading a nut onto the shaft of the connection member and tightening the nut to push one of the bolt head and the nut into the axial retainer, to press the axial retainer longitudinally towards the intermediate sleeve to the compressed position, and to cause the flange segment of the axial retainer to deflect and apply the longitudinal preload force to the intermediate sleeve as the flange segment of the axial retainer contacts and is pushed against the intermediate sleeve.

\* \* \* \* \*